United States Patent [19]

Kazami

[11] Patent Number: 5,493,355
[45] Date of Patent: Feb. 20, 1996

[54] CAMERA INFORMATION RECORDING APPARATUS

[75] Inventor: Kazuyuki Kazami, Tokyo, Japan

[73] Assignee: Nikon Corporation, Tokyo, Japan

[21] Appl. No.: 419,766

[22] Filed: Apr. 10, 1995

Related U.S. Application Data

[63] Continuation of Ser. No. 201,085, Feb. 24, 1994, abandoned, which is a continuation of Ser. No. 975,122, Nov. 12, 1992, abandoned, which is a continuation of Ser. No. 726,813, Jul. 8, 1991, abandoned.

[30] Foreign Application Priority Data

Jul. 10, 1990 [JP] Japan .................................... 2-181976

[51] Int. Cl.$^6$ .................................................. G03B 17/24
[52] U.S. Cl. ........................................ 354/106; 354/173.11
[58] Field of Search ................................... 354/105, 106, 354/173.1, 173.11

[56] References Cited

U.S. PATENT DOCUMENTS

| | | | |
|---|---|---|---|
| 5,006,873 | 4/1991 | Wash ...................................... | 354/106 |
| 5,021,820 | 6/1991 | Robison et al. ....................... | 354/106 X |
| 5,065,232 | 11/1991 | Kondo ..................................... | 358/909 |

*Primary Examiner*—David M. Gray
*Attorney, Agent, or Firm*—Staas & Halsey

[57] ABSTRACT

A camera has a recording apparatus for magnetically recording finished photograph information, indicating exposure of a film frame, and for magnetically recording other photograph information for each film frame. The finished photograph information is recorded at a designated film area, while a film feed motor is in a transient speed state. Other photograph information is recorded in a designated film area when the film feed motor speed is constant. Appropriate positioning of the designated recording areas for recording information therein is determined by counting film perforations or by measuring a period of time during film feed subsequent to an exposure.

30 Claims, 7 Drawing Sheets

FIG. 2A
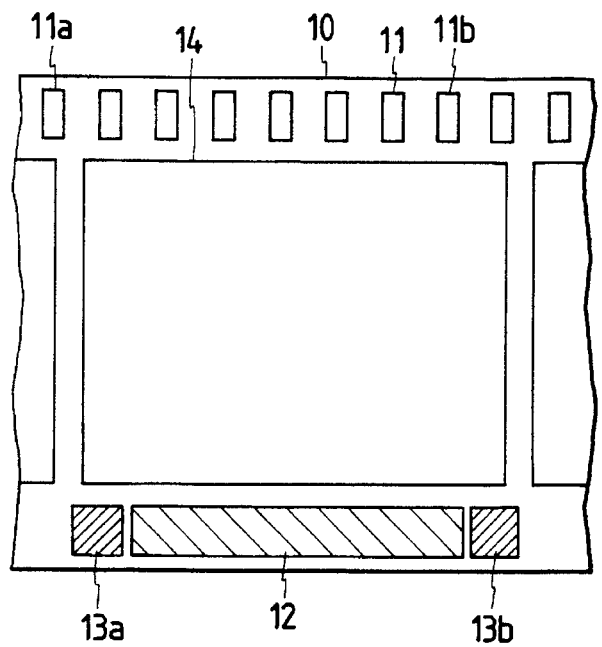
FIG. 2B
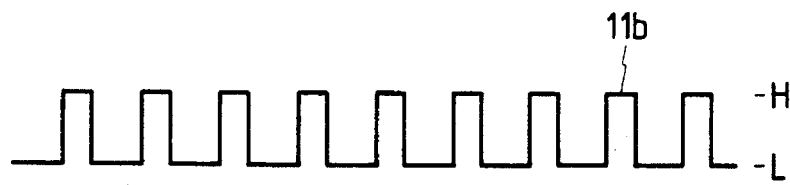
PERFORATION
DETECTION
WAVE
FEED MOTOR
DRIVE COMMAND
FEED MOTOR
SPEED
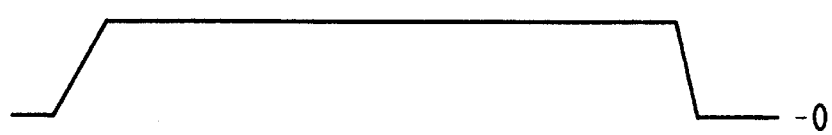
INFORMATION
RECORD
SIGNAL
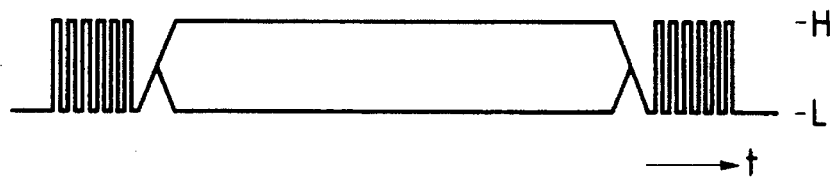

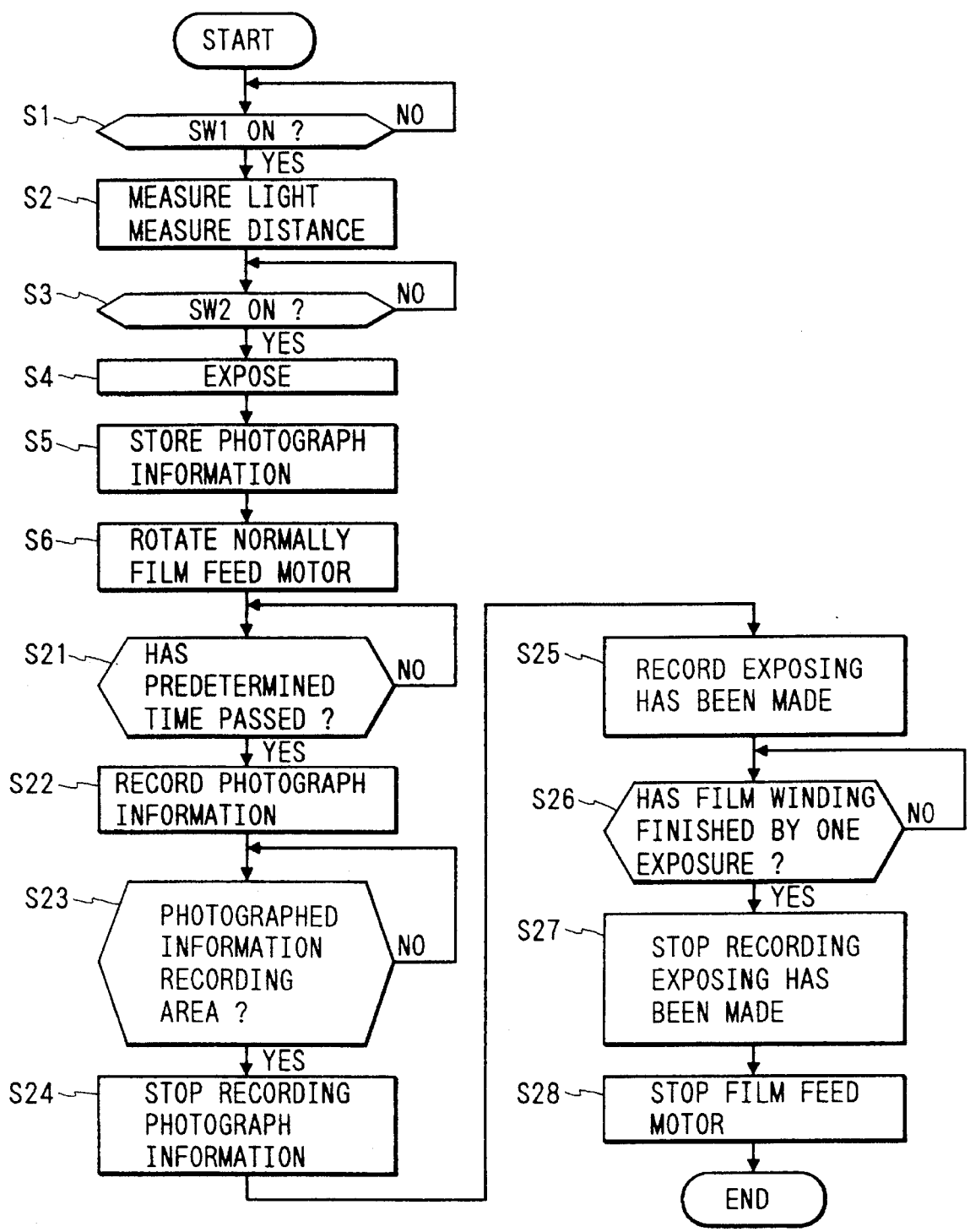

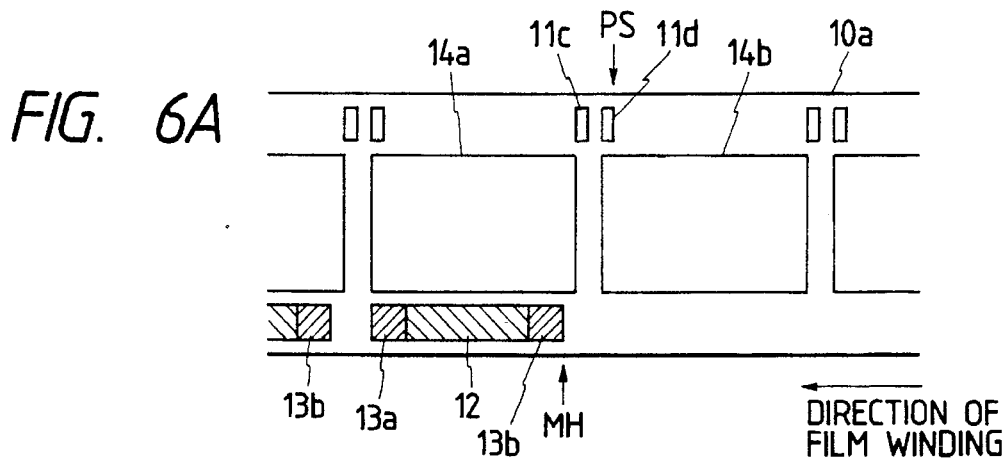
FIG. 6A
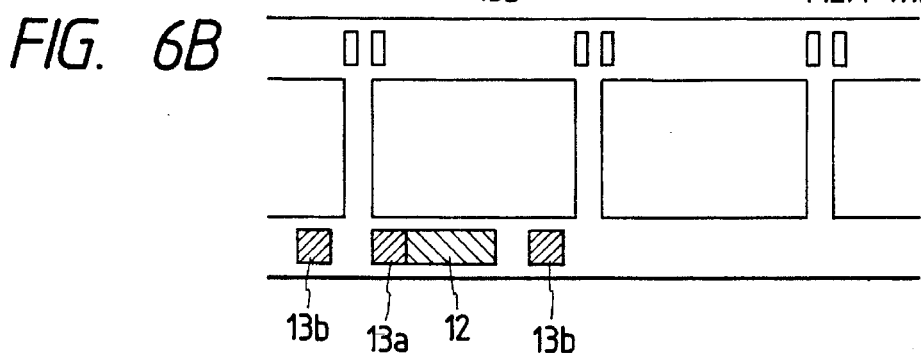
FIG. 6B
FIG. 7
PERFORATION DETECTION WAVE
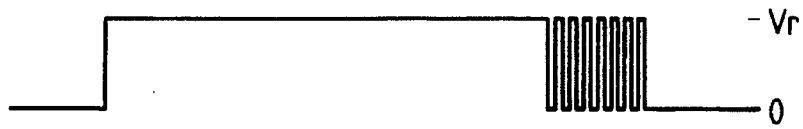
VOLTAGE APPLIED TO FEED MOTOR
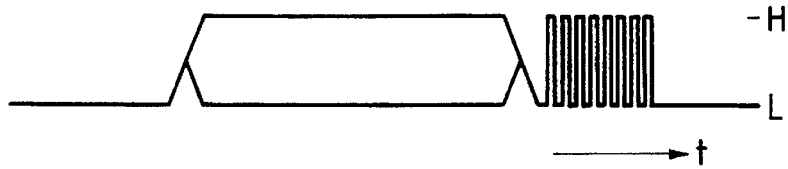
INFORMATION RECORD SIGNAL

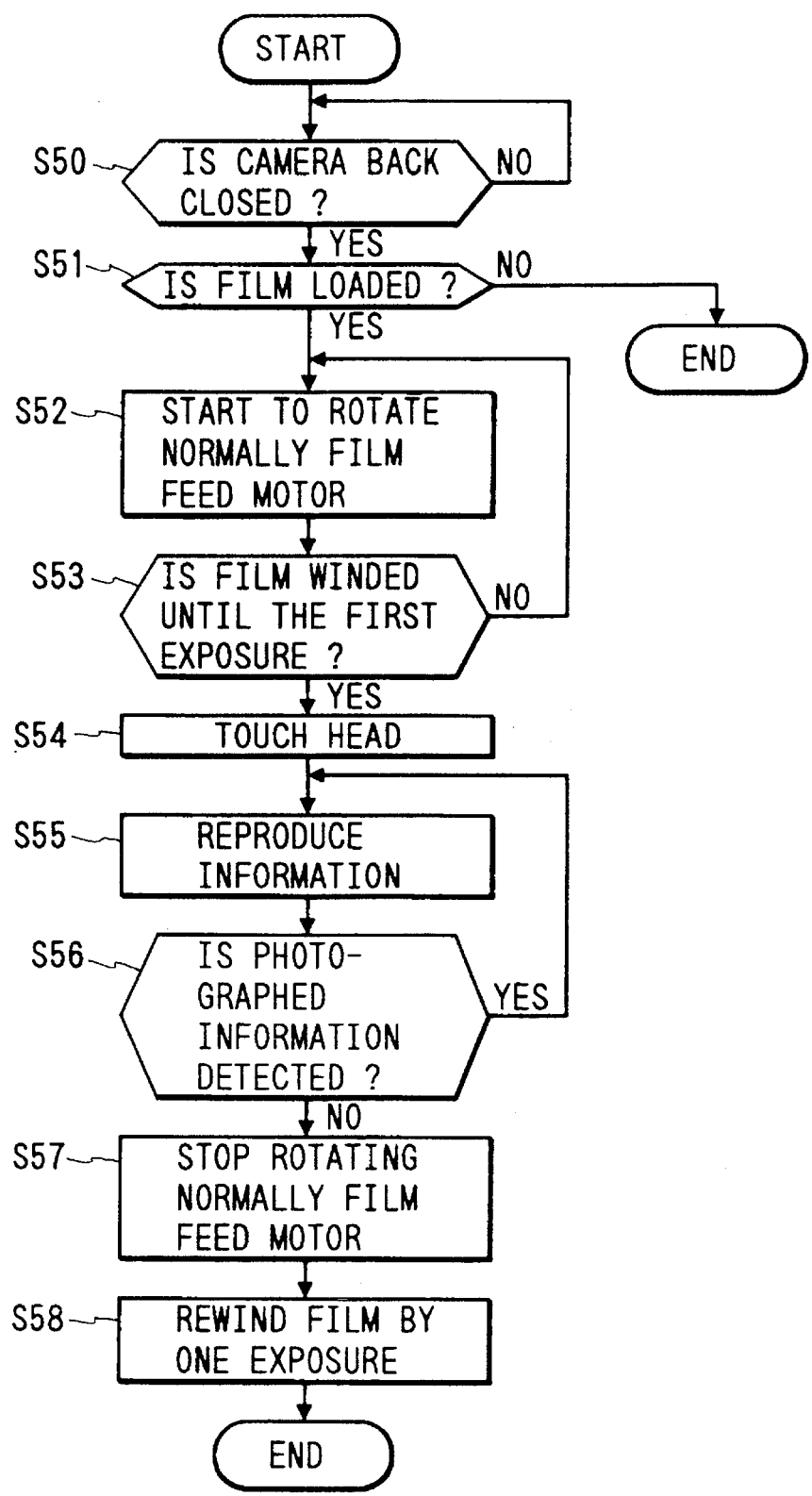

CAMERA INFORMATION RECORDING APPARATUS

This is a continuation of application Ser. No. 08/201,085 filed Feb. 24, 1994, now abandoned, which is a continuation of application Ser. No. 07/975,122 filed Nov. 12, 1992, which is a continuation of application Ser. No. 07/726,813 filed Jul. 8, 1991, both of which are abandoned.

BACKGROUND OF THE INVENTION

1. Field of the Invention

The present invention relates, in a camera, to a finished photograph information recording apparatus for recording information on whether or not a photographing has been finished at every exposure of a film.

2. Related Background Art

Where a photographing condition changes, or, for example, a subject of low brightness in a room is photographed after a subject of high brightness is photographed under an extraneous light, there may be a case in which a film of another photosensitivity will be used for photographing. In such a case, the film is rewound to a cartridge, extracted from a camera, and after photographing the subject by a desired film, the previous film is loaded again.

In this case, an unexposed portion of the reloaded film must be placed in a predetermined position to photograph, that is, kept facing toward an aperture. Such positioning may be realized by the following methods:

(1) Information on the finished photograph exposure number is recorded in a film or a catridge, and then reproduced to feed an unexposed portion of the film to a position to photograph.

(2) An ID for specifying a film used is recorded in a film or a cartridge, reproduced then to read finished photograph exposure number information of a film of the ID, and an unexposed portion of the film is fed to a predetermined position to photograph.

(3) Information on whether or not a photographing has been finished is recorded additionally in an area for recording trimming information of each exposure of a film and data information, reproduced then to feed the film and where there remains a portion unexposed, the film is stopped at the exposed position.

The methods (1) to (3) above are premised subject to information recorded in the film or cartridge being reproduced securely.

Be that as it may, information is capable of being not reproduced securely at the time of reproduction due to problems such as various noises arising within a camera, a tracking error to a record track on a film in which information is recorded, and crosstalk arising from writing information repeatedly on the same portion.

According to the method (3), since information on whether or not a photographing has been finished is recorded in the area for recording information on each photograph exposure, the area for recording photograph information is lessened inevitably.

SUMMARY OF THE INVENTION

An object of the present invention is to provide, in a camera, finished photograph information recording apparatus for recording information on whether or not a photographing has been finished outside an area wherein other photograph information for each exposure is recorded.

Another object of the present invention is to provide, in a camera information recording apparatus capable of recording photograph information, such as trimming information, data information and the like, in a photograph information recording area for each exposure, uniformly in recording density so as to reproduce it securely.

A further object of the present invention is to provide a camera capable of placing an unexposed portion of a film in position opposite to an aperture so as not to leave a blank portion for one exposure.

Referring now to FIG. 1 representing one embodiment, the present invention is applied, in a camera, to a finished photograph information recording apparatus for recording finished photograph information on whether or not each exposure of a film has been made, photographed magnetically in the film. Photographed The finished photograph information shows that exposure has been made.

The aforementioned object will be attained by providing film feed means M, 1 for winding and rewinding a film, recording position detection means PS, 4 for detecting a position to record finished photograph information at a front end and/or a rear end of each film frame or exposure, finished photograph information recording means MH, 2 for recording information in a film, and control means 5 for recording finished photograph information of an exposure through the recording means MH, 2 when a position to record the finished photograph information is detected by the recording position detection means PS, 4 at the time when a film is fed.

If the position to record finished photograph information is detected by the recording position detection means PS, 4 when the film is fed by the film feed means M, 1, the control circuit 5 records the finished photograph information of an exposure through the recording means MH, 2.

In this connection, an illustration of an embodiment has been used for describing a construction of the invention; however, the present invention is not necessarily limited to the embodiment only.

BRIEF DESCRIPTION OF THE DRAWINGS

FIG. 2A is a drawing exemplifying a film used for the invention;

FIG. 2B is a time chart indicating waveforms of each part of the apparatus when the film is fed;

FIG. 5 is a flowchart showing another finished photograph information recording control program;

FIGS. 6A, 6B are drawings exemplifying other films;

FIG. 7 is a time chart indicating waveforms of each part of the apparatus when the films are fed;

FIG. 9 is a flowchart showing the control program when a film is reloaded.

DESCRIPTION OF THE PREFERRED EMBODIMENTS

Figure 1:
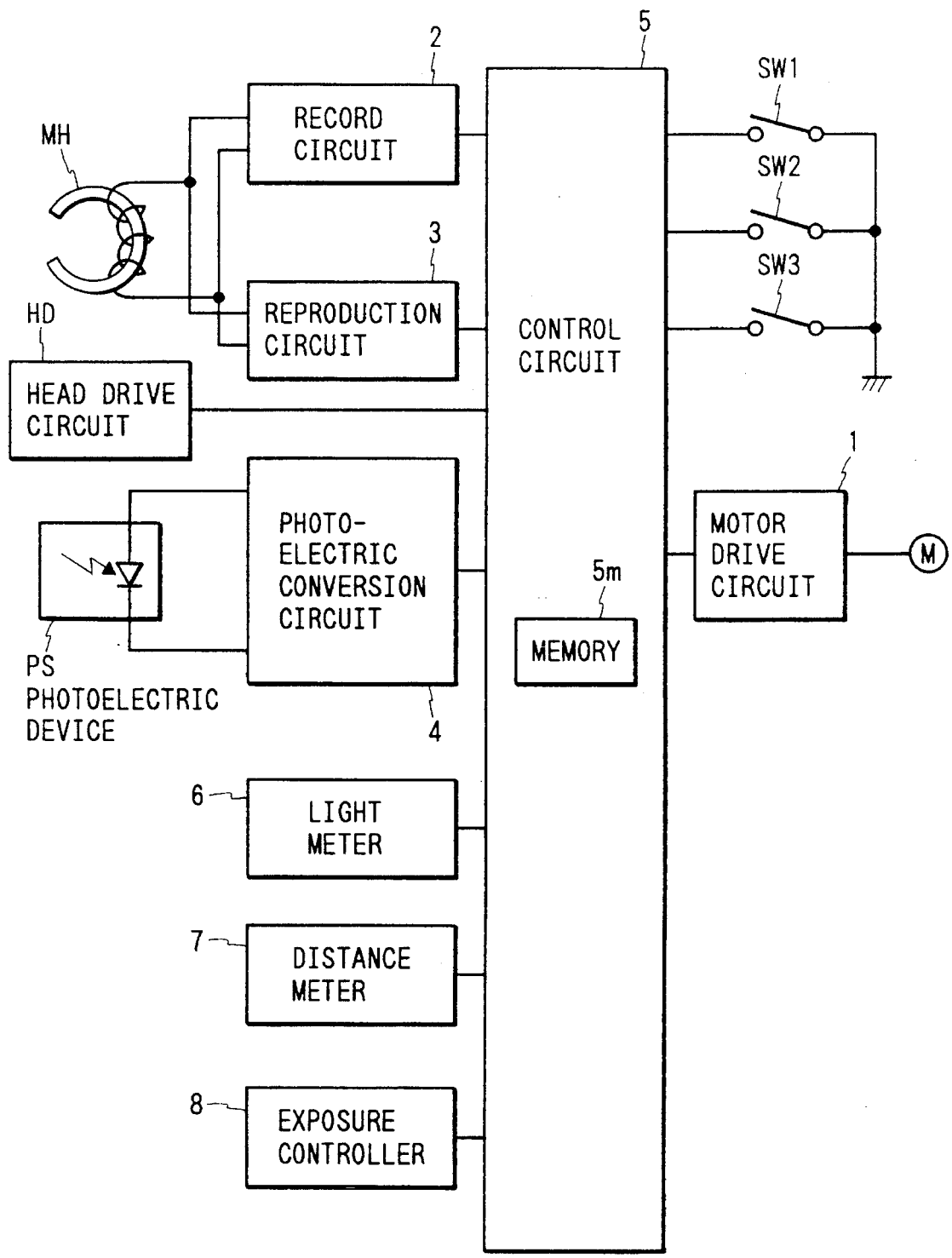
FIG. 1 is a block diagram representing one embodiment of the invention.

FIG. 1 is a block diagram representing one embodiment of the present invention.

A reference character 1 denotes a motor drive circuit, driving the film feed motor M for winding and rewinding of a film. A reference character 2 denotes a record circuit, recording various items of information in a film through the recording/reproducing magnetic head MH connected thereto. A reference character 3 denotes a reproducing circuit, reproducing various items of information recorded on the film through the magnetic head MH connected thereto. HD denotes a head drive circuit, operating to drive the magnetic head MH longitudinally of a film surface, and to bring the magnetic head MH into contact with the film only when recording/reproducing information against the film.

A reference character 4 denotes a photoelectric conversion circuit, detecting perforations on the film by a photoelectric element PS such as photoreflector or the like which is connected thereto. A perforation detection signal generated thereby is sent to the control circuit 5 described herein-later for counting the number of frames of a film and placing each exposure portion in a predetermined position to photograph.

A reference character SW1 denotes a shutter release half-push switch, which is turned on at the time of shutter release half-push. A reference character SW2 denotes a shutter release full-push switch, which is turned on at the time of shutter release full-push. Further, SW3 denotes a camera back switch, which is turned on when a camera back is opened.

A reference character 5 denotes a control circuit comprising peripheral parts such as a microcomputer, memory 5m and others, running a control program which will be described hereinlater to control the motor drive circuit 1, the record circuit 2 and the reproducing circuit 3 according to signals from the switches SW1 to SW3 and the photoelectric conversion circuit 4.

Further, 6 denotes a light meter, measuring light within a photograph screen to output brightness information. A reference character 7 denotes a distance meter, measuring a distance of a subject (not indicated) to output distance information. A reference character 8 denotes an exposure controller, controlling a shutter mechanism and a diaphragm mechanism (both not indicated).

FIG. 2A is an illustration exemplifying a photographing film used for the embodiment, and FIG. 2B is a time chart showing a perforation detection wave detected by the photoelectric conversion circuit 4, a drive command of the feed motor M which is outputted from the control circuit 5 to the motor drive circuit 1, a speed of the feed motor M and an information record signal outputted from the control circuit 5 to the record circuit 2.

Perforations 11 are provided on one side of a film 10, and a photograph information storage area 12 and finished photograph information storage areas 13a, 13b are set on the other side. The term "finished photograph information" designates information indicating that a corresponding film frame has been exposed. The term "photograph information" (as distinguished from "finished photograph information") designates information other than "finished photograph information." Such other photograph information may include, e.g., trimming information, the exposure value, the exposure date, etc., as stated earlier and hereinafter.

When recording photograph information for each exposure in the film, it is preferable that the information be recorded uniformly in recording density in all spots so as to avoid a read error at the time of reproducing as mentioned hereinbefore. However, the film 10 is wound by one exposure by the feed motor M whenever an exposure is finished. In this case, as shown in FIG. 2B, the speed of feed motor M does not rise so soon and increases slowly against the drive command of the feed motor M. Further, if the drive command of the motor M comes to a low level at the time of fall of a detection puse signal of a perforation 11b and thus a stop command is given out, the motor M does not stop right away and decreases its speed slowly. Thus, a feed speed changes at a front end portion of each exposure according to a rise of speed of the motor M, and the feed speed changes at a rear end portion of each exposure according to a fall of speed of the motor M. If these front end portion and rear end portion of each exposure are intended for a recording area of the photograph information, then a recording density of the information will not be uniform, which is not preferable for realizing a secure reproduction.

Accordingly, the area 12 excluding the front end portion and rear end portion of each exposure where the film is fed at a constant rate to secure a uniform recording density is assigned to a recording area of the photograph information.

On the other hand, the area 13a of the front end portion or the area 13b of the rear end portion of each exposure which is not appropriate as a photograph information recording area is assigned to the finished photograph information recording area. Thus, the area not appropriate as an information recording area is intended for the finished photograph information recording area to realize a secure reproduction, therefore the information recording method will be defined as follows. That is, when an exposure has already been made, a signal of such frequency as is higher than a signal frequency of the photograph information or of a different frequency band is generated in the record circuit 2, and is recorded in the area 13a or 13b through the magnetic head MH. On the other hand, if there is no exposure, then nothing will be recorded.

Finished photograph information recorded according to such recording method is reproduced by the magnetic head MH and the reproducing circuit 3, and whether or not the photographing is finished can easily be discriminated. In other words, when the magnetic head MH passes the area 13a or 13b, if a pulse signal of frequency higher than a signal frequency of the photograph information or of different frequency band is detected, it is decided that the exposure has already been made, but if not, then the film frame is left unexposed for photographing.

As described above, while the front end portion or rear end portion of each exposure is assigned to a finished photograph information recording area, both the front and rear end portions may be assigned to the finished photograph information recording area. Further, a method for recording the finished photograph information is not necessarily limited to the method mentioned above, and any method may be employed subject to securing a reproduction by simple information and distinguishing easily from the photograph information. Still further, the number of perforations is not limited to the number shown in FIG. 2A.

Figure 3:
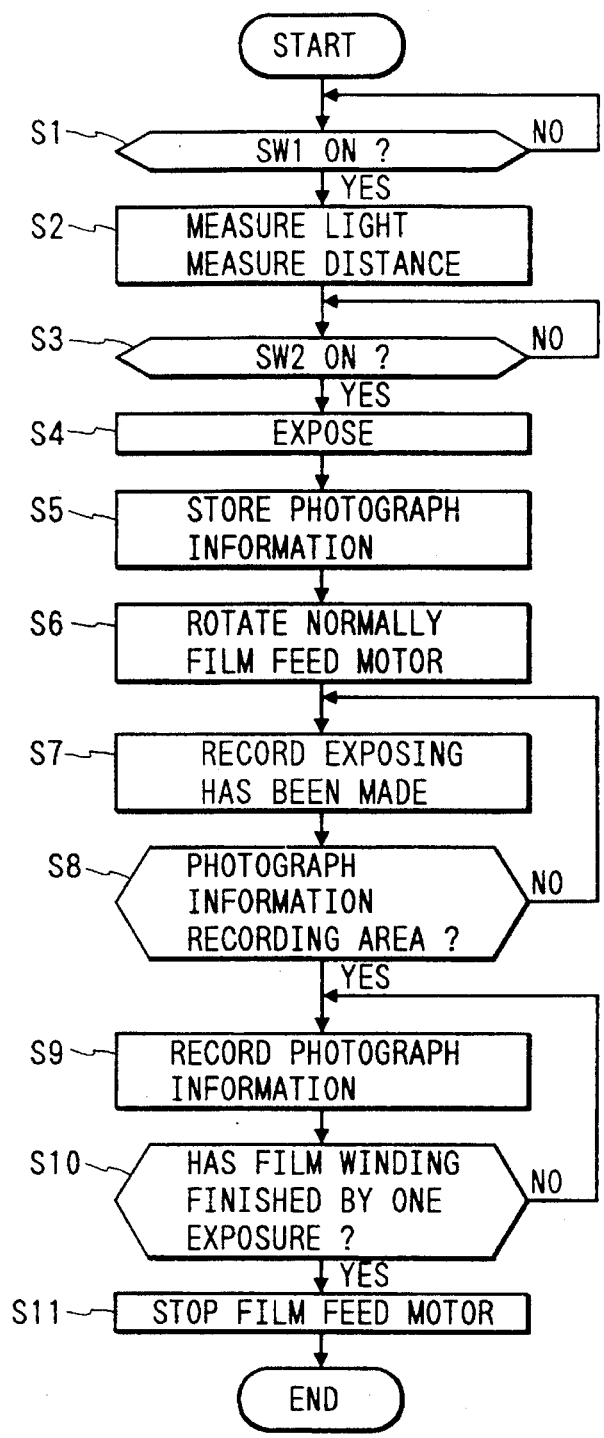
FIG. 3 is a flowchart exemplifying a finished photograph information recording program.

FIG. 3 is a flowchart showing a control program for recording the finished photograph information which is run by the control circuit 5. The control program is intended for recording the finished photograph information in the front end area 13a of each exposure shown in FIG. 2A. An operation of the finished photograph information recording apparatus will be described with reference to FIG. 1 to FIG. 3. In advance to running the control program, the magnetic head MH is pushed to the film 10 by the head drive circuit HD and thus is ready for recording and reproducing information.

In step S1, whether or not a shutter release is pushed half by the switch SW1 is discriminated, and the step is repeated until it is pushed so. When the shutter release is pushed half, the flow proceeds to step S2, where light within a photograph screen is measured by the light meter 6, and distance of a subject is measured by the distance meter 7, thereby focusing a photographing lens.

In step S3, whether or not the shutter release is pushed full by the switch SW2 is discriminated, and the step is repeated until it is pushed so. When the shutter release is pushed full, the flow proceeds to step S4, where shutter speed and diaphragm values are calculated by the exposure controller 8, and the shutter mechanism and the diaphragm mechanism are controlled for exposure according to the exposure values.

When the photographing is over, the flow proceeds to step S5, where exposure values at the time of photographing in the above step, trimming information, photograph information such as photographed date and others and finished photograph information indicating that the photographing is finished are stored in the memory $5m$. In the ensuing step S6, the feed motor M is actuated to run normally through the motor drive circuit 1, thus commencing a winding of the film 10.

In step S7 immediately after commencing the winding of the film 10, a recording of the finished photograph information is commenced in the front end area 13a of an exposure 14 according to the above-described recording method, and in the ensuing step S8, the perforations 11 on the film are detected by the photoelectric element PS and the photoelectric conversion circuit 4, whether or not the recording area 12 of photograph information has reached the recording position is discriminated, and if so, the flow proceeds to step S9, but if not, then the flow returns to step S7. In step S9, the recording of the finished photograph information is stopped and the photograph information stored in the memory $5m$ in step S5 is read out, and the photograph information is recorded through the record circuit 2. In the ensuing step S10, a determination is made as to whether or not a predetermined number of perforations 11 have been detected after commencing the winding in step S6, that is, whether or not a winding by one exposure has been finished is discriminated, and if finished, the flow proceeds to step S11 to stop the film feed motor M, but if not, then the flow returns to step S9 to go on with recording the photograph information. When the above process is over, the program run is closed.

As described above, the finishing photograph information is recorded in the area 13a where a film feed rate after commencing the winding is not constant according to the method, whereby whether or not a photographing has been finished can easily be discriminated at the time of reproducing. Therefore an unexposed film portion can be identified securely at the time of reproducing without reducing the recording area 12 of the photograph information.

Figure 4:
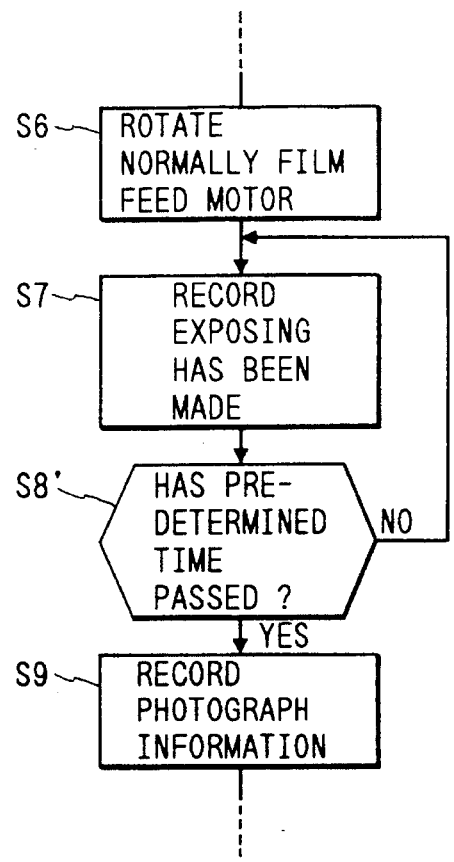
FIG. 4 is a flowchart exemplifying an alternative thereof.

In the aforementioned control program, a recording of the finished photograph information is commenced in a timing immediately after a feed of the film 10 is commenced from rotating the film feed motor M normally, and when appropriate positioning of the recording area 12 of the photograph information through detection of the perforations 11 on the film, a recording of the finished photograph information is stopped. However, as shown in step S8' of FIG. 4, the finished photograph information may be recorded for a predetermined period of time after the point in time when a recording of the finished photograph information is commenced, using a timer, and then the recording of the finished photograph information may be stopped after the lapse of a predetermined period of time.

FIG. 5 is a flowchart showing another example of the control program for recording finished photograph information. The control program is intended for recording the finished photograph information in the rear end area 13b of each exposure shown in FIG. 2. The processing steps similar to the control program shown in FIG. 3 are numbered likewise and a description is given centrally of the difference.

In step S6 the film feed motor M is actuated to run normally to commence a winding of the film 10, and then the flow proceeds to step S21 where a timer is operated to see whether or not a predetermined time has passed. The flow then proceeds to step S22, where a recording of the photograph information is commenced, and in the ensuing step S23, whether or not the finished photograph information recording area 13b comes into position is discriminated. The finished photograph information recording area 13b is detected by counting a predetermined number of the perforations 11 on the film fed. In step S23 if the finished photograph information recording area 13b is so identified, the flow proceeds to step S24 to stop recording of the photograph information, and then a recording of the finished photograph information is commenced in step S25. In the ensuing step S26, whether or not a film winding by one exposure is finished is discriminated by the number of perforations counted after start of the winding, the recording of the finished photograph information is kept going until it is finished, and when the winding by one exposure is finished, the flow proceeds to step S27 to stop the recording of the finished photograph information. Further, in the ensuing step S28, the film feed motor M is stopped to close the program run.

As described above, the finished photograph information is recorded in the area 13b where a film feed rate immediately before a film winding by one exposure is closed is not constant whereby whether or not a photographing is finished can easily be discriminated at the time of reproducing. Therefore an unexposed portion can be identified securely at the time of reproducing without reducing the photograph information recording area 12.

In the aforementioned program, the finished photograph information recording area 13b is detected according to a result obtained from counting the perforations on the film, and thus a recording of the finished photograph information is commenced. However, the recording of the finished photograph information may be commenced in a timing when a recording of the photograph information is over.

FIG. 6A shows a film 10a provided with 2 perforations against each exposure, indicating a state where an unexposed portion 14b stops opposite to the aperture from feeding the film by one exposure in the direction indicated by an arrow after an exposure 14a is made. In the illustration, PS represents a position whereat a photoelectric element is provided, and MH represents a position whereat a magnetic head is provided.

When a photographing is over against the exposure 14a, the film 10a is wound by one exposure and stops as shown in FIG. 6A. The finished photograph information can also be recorded likewise against such film 10a.

When the finished photograph information is recorded in the front end area 13a of an exposure, a recording of the finished photograph information is commenced after the film feed motor M is actuated to run normally to commence a winding, and after a predetermined period of time the recording of the finished photograph information is stopped to commence a recording of the photograph information.

When recording the finished photograph information in the rear end area 13b of the exposure, a recording of the photograph information is commenced after a predetermined time from commencing a film winding, and when a perforation 11c shown in FIG. 6A is detected by the photoelectric element PS, the recording of the photograph information is stopped, and a duty drive of the feed motor M is commenced for placing the unexposed portion 14b accurately in a position opposite to the aperture. The recording of the finished photograph information is also commenced in a timing when the duty drive of the feed motor M is commenced. Further, when the photoelectric element PS detects the next perforation 11d, the duty drive of the feed motor M is stopped to stop feed of the film 10a, and the recording of the finished photograph information is stopped.

FIG. 7 shows a perforation detection wave in this case, an applied voltage wave of the feed motor M, and an information record signal wave. Normally, a duty drive of the feed motor M for placing the film in position is carried out by applying a supply voltage Vr to a driving electrode of the feed motor M repeatedly at a predetermined duty ratio; therefore noise is produced incidentally. A recording of information on the film is capable of causing a recording/reproducing error of information. However, according to the aforementioned method for recording the finished photograph information, the information is simply that of repeating a high level and a low level at high frequency. Therefore an influence of the noise is nothing serious, and moreover the recording area 12 is free from being influenced by the noise.

As described above, in case the finished photograph information is recorded in the rear end area 13b of an exposure, the recording may be commenced in a timing when a duty drive of the feed motor M is commenced.

In this connection, the timing of closing a recording of the photograph information is not particularly limited to the above-described embodiment, and thus, as shown in FIG. 6B, the recording of the photograph information may be closed at the point in time when the recording of the photograph information of the exposure comes all to an end.

In the above-described embodiment, an arrangement is such that the finished photograph information and the photograph information are recorded when a photograph-finished film is wound, however, information may be recorded otherwise at every exposure when the film is rewound to a film cartridge.

Figure 8:
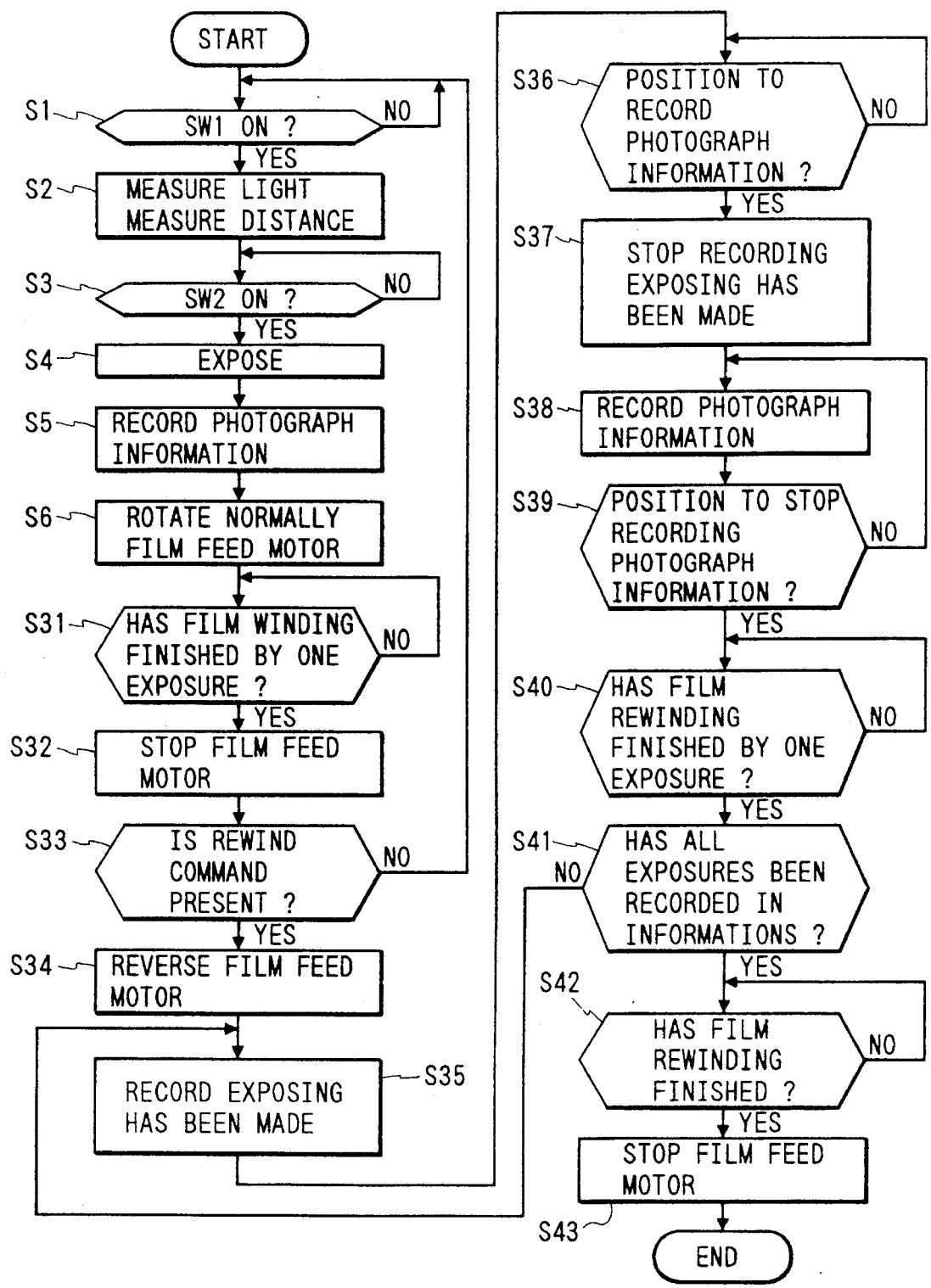
FIG. 8 is a flowchart showing a control program for recording finished photograph information at the time of film rewinding.

FIG. 8 is a flowchart showing a control program for recording the photograph information and the finished photograph information in a film at the time of rewinding. Then, like reference characters represent like process steps given in FIG. 3, and hence a further description will be omitted thereof.

After the film feed motor M is actuated to run normally in step S6, the flow proceeds to step S31, where whether or not a winding by one exposure is finished is discriminated, and the feed motor M is kept running normally until the winding is finished. When the winding by one exposure is finished, the flow proceeds to step S32, where the film feed motor M is stopped.

Next in step S33, whether or not a film rewinding command is inputted is discriminated, and if the rewinding command is inputted, the flow proceeds to step S34, but if not, then the flow returns to step S1. In step S34 next, the film feed motor M is reversed to commence a film rewinding, and in the ensuing step S35, a recording of the finished photograph information is commenced. That is, the finished photograph information is recorded in the rear end area 13b of an exposure. In step S36, whether or not a position to record the photograph information comes is discriminated, and the step is repeated until the position to record the photograph information comes. When the position to record the photograph information comes, the flow proceeds to step S37, where a recording of the finished photograph information is stopped, and then the flow proceeds to step S38. In step S38, photograph information of the exposure is read from the memory 5m, the recording is commenced and then the flow proceeds to step S38, where the process is kept going until a position to stop recording of the photograph information comes.

Next in step S40, whether or not a rewinding by one exposure is finished is discriminated, and the rewinding is continued until a film is rewound completely by one exposure. When the rewinding by one exposure is finished, the flow proceeds to step S41, where whether or not information has been recorded in all exposures is discriminated, and if not finished, then the flow returns to step S35 to record the finished photograph information and the photograph information to the next exposure. When a recording of the finished photograph information and the photograph information is finished to all exposures, the flow proceeds to step S42, where whether or not the film is rewound completely to a cartridge is discriminated, and the feed motor M is kept reversed until the rewinding is finished. When the rewinding is over, the flow proceeds to step S43, the film feed motor M is stopped reversing, and the program run is closed.

Thus, the photograph information and the finished photograph information are stored in the memory 5m at every exposures, and the photograph information and the finished photograph information are read from the memory 5m at every exposures to recording at the time of film rewinding.

While the finished photograph information is recorded in the rear end area 13b of each exposure in the aforementioned program, the finished photograph information may be recorded in the front end area 13a or in both otherwise.

Next described is an operation for feeding an unexposed portion to a position opposite to the aperture when the film in which the finished photograph information is recorded as above is reloaded.

FIG. 9 shows a control program at the time of film reloading.

In step S50, whether or not a camera back is closed by the switch SW3 is discriminated, the step being repeated until it is closed perfectly, and when it is closed, the flow proceeds to step S51. In step S51, whether or not the film is loaded is discriminated by a cartridge switch (not indicated), and if loaded, the flow proceeds to step S52, but if not, then the program run is closed. In step S52, the film feed motor M is actuated to run normally to commence a winding of the film. In the ensuing step S53, whether or not the film is wound up to the first exposure is discriminated, and the step is repeated until the first exposure is obtained. When the film is wound up to the first exposure, the flow proceeds to step S54, where the magnetic head MH is touched to the film by the head driving device HD, and then the flow proceeds to step S55 to commence a reproduction of information recorded in the film. In the ensuing step S56, whether or not the finished photograph information is detected, that is, whether or not a pulse signal of a frequency higher than the signal frequency of photograph information or of a different frequency band is detected through the recording/reproducing circuit 3 is discriminated, and if detected, the flow returns to step S55, but if not, indicating an unexposed portion, then the flow proceeds to step S57. In step S57 the film feed motor M is stopped running normally, and in the ensuing step S58 the feed motor M is reversed to rewind the film by one exposure. That is, the unexposed portion is placed in a position opposite to the aperture. When the above process is over, the program run is closed.

As described, when the film is rewound on the way to photographing and the film extracted from a camera is reloaded, the film is wound for reproducing the finished photograph information, and the unexposed portion thus detected is set to a predetermined position to photograph. Then in this case, if a plurality of pulse signals with high frequency are detected by the reproducing circuit 3 when the magnetic head MH passes the finished photograph information recording areas 13a, 13b, an exposure already photographed, is detected and if nothing has been detected, then an unexposed portion is indicated. Thus whether or not an exposure has been made can be identified securely without being influenced by problems such as noise within the camera, tracking error of information recording tracks, crosstalk and the like, and further since the signal frequency is high, it is distinguished definitely from the photograph information.

In the above-described embodiment, the film feed motor M and the motor drive circuit 1 construct film feed means, the photoelectric element PS, the photoelectric conversion circuit 4 and others construct recording position detection means, the magnetic head MH and the record circuit 2 construct finished photograph information recording means, and the control circuit 5 constructs control means.

A described above, according to the present invention, finished photograph information on whether or not an exposure has been made is recorded in a finished photograph information recording area at the front end and/or rear end of each exposure area, which is not appropriate as the area to record photograph information. Therefore the finished photograph information can be recorded without reducing the area to record the photograph information such as exposure value and others.

What is claimed is:

1. Information recording apparatus in a camera having exposing means for exposing successive film frames, comprising:
   film feed means having a motor for feeding a film having successive frames, the motor having transient speed states during starting and stopping of the feeding of each film frame and having a substantially constant speed state between the transient speed states for the feeding of each film frame;
   recording means responsive to said exposing means for recording finished photograph information indicating that a corresponding film frame has been exposed, and
   control means for causing said recording means to record finished photograph information only while said motor is in a transient speed state.

2. The apparatus as defined in claim 1, wherein the film has a designated recording area, adjacent to at least one of front and rear ends of each film frame, for the recording of finished photograph information, and wherein said control means causes said recording means to record finished photograph information only in a designated recording area.

3. The apparatus as defined in claim 2, wherein the film has further designated recording areas for the recording of photograph information other than finished photographed information, and wherein said control means causes said recording means to record other photograph information in a further designated recording area only while said motor is in the substantially constant speed state.

4. The apparatus as defined in claim 3, wherein said control means has recording position detecting means for detecting that at least one of a designated recording area and a further designated recording area is positioned relative to said recording means for recording therein.

5. The apparatus as defined in claim 4, wherein said recording position detecting means comprises means for determining that a predetermined length of film has been fed during the feeding of each film frame.

6. The apparatus as defined in claim 4, wherein said recording position detection means comprises means for determining that a predetermined period of time has elapsed during the feeding of each film frame.

7. The apparatus as defined in claim 1, wherein said film feed means is capable of winding and rewinding said film, and said control means causes said recording means to record finished photograph information during film rewinding.

8. Information recording apparatus in a camera, comprising:
   film feed means having a motor for feeding a film, the motor having a transient speed state during the starting and stopping of the feeding of the film and having a substantially constant feed state after a predetermined length of film has been fed;
   recording means for recording photograph information on the film; and
   control means for causing said recording means to record said photograph information on the film only during the substantially constant speed state of said motor;
   wherein said film has a plurality of perforations spaced in a feed direction of the film, and wherein said control means includes means for detecting passage of a predetermined number of film perforations during feeding of the film and thereafter causing said recording means to record photograph information.

9. Information recording apparatus in a camera, comprising:
   film feed means having a motor for feeding a film, the motor having a transient speed state during the starting and stopping of the feeding of the film and having a substantially constant feed state after a predetermined length of film has been fed;
   recording means for recording photograph information on the film; and
   control means for causing said recording means to record said photograph information on the film only during the substantially constant speed state of said motor;
   wherein said control means causes said recording means to record finished photograph information, indicating that a corresponding film frame has been exposed, during said transient speed state.

10. Information recording apparatus in a camera, comprising:
    film feed means having a motor for feeding a film;
    recording means for recording finished photograph information on said film indicating that a corresponding film frame has been exposed and for recording other photograph information on said film; and
    control means for causing said recording means to record said finished photograph information on the film while the motor is starting or stopping and for recording said other photograph information on the film only when the motor speed is substantially constant, said finished photograph information and said other photograph information being recorded at different recording frequencies.

11. Information recording apparatus in a camera, comprising:

film feed means having a motor for feeding a film having successive frames, the film having a recording area adjacent to a front end and/or a rear end of each film frame;

detecting means for detecting said recording area;

recording means for recording onto said recording area finished photograph information indicating that a corresponding film frame has been exposed; and control means for controlling said recording means to enable said recording means as the film feeding is started and to disable said recording means in accordance with a result of said detecting means.

12. The apparatus as defined in claim 11, wherein said motor has transient speed states which are a starting state and a stopping state of the feeding of each film frame and has a constant speed state between the transient speed states, and wherein the state of said motor during the recording by said recording means is said transient speed state.

13. The apparatus as defined in claim 11, wherein said detecting means comprises means for determining that a predetermined length of film has been fed during the feeding of each film frame.

14. The apparatus as defined in claim 11, wherein said detecting means comprises means for determining that a predetermined period of time has elapsed during the feeding of each film frame.

15. The apparatus as defined in claim 11, wherein said film feed means is capable of winding and rewinding said film, and said control means causes said recording means to record finished photograph information during film rewinding.

16. The apparatus as defined in claim 11, wherein said film has a photograph information recording area which is different from the first-mentioned recording areas, wherein said detecting means detects said photograph information recording area, and wherein said recording means records onto said photograph information recording area photograph information different from said finished photograph information in accordance with a result of said detecting means.

17. The apparatus as defined in claim 16, wherein said photograph information recording area is disposed between first-mentioned recording areas adjacent to the front and rear ends of each film frame.

18. The apparatus as defined in claim 16, wherein said motor has transient speed states which are a starting state and a stopping state of the feeding of each film frame and has a constant speed state between the transient speed states, and wherein the state of said motor during the recording of said photograph information of said recording means is said constant speed state.

19. Information recording apparatus in a camera which is capable of recording information onto a film, comprising:

film feed means having a motor for feeding a film having a plurality of perforations spaced in a feed direction of the film;

recording means for recording photograph information onto said film;

detecting means for detecting an area disposed on the film, onto which said photograph information is recorded, in accordance with said perforations during feeding of the film, and control means for causing said recording means to record said photograph information onto the film in accordance with a result of said detecting means.

20. The apparatus as defined in claim 19, wherein said motor has transient speed states which are a starting state and a stopping state of the feeding of each film frame and has a constant speed state after a predetermined length of film has been fed, and wherein said control means causes said recording means to record said photograph information.

21. The apparatus as defined in claim 19, wherein said detecting means detects a time when said motor is decelerated in accordance with said perforations during feeding of the film, and wherein said apparatus further comprises record controlling means for ceasing recording of said photograph information by said recording means in response to the detection of said time.

22. Information recording apparatus in a camera having an exposing unit to expose successive film frames, comprising:

a film feeding unit having a motor to feed a film having successive frames, the motor having transient speed states during starting and stopping of the feeding of each film frame and having a substantially constant speed state between the transient speed states for the feeding of each film frame:

a recorder responsive to said exposing unit to record finished photographing information indicating that a corresponding film frame has been exposed; and a controller to cause said recorder to record finished photograph information only while said motor is in a transient speed state.

23. Information recording apparatus in a camera, comprising:

a film feeding unit having a motor to feed a film, the motor having a transient speed state during the starting and stopping of the feeding of the film and having a substantially constant speed state after a predetermined length of film has been fed:

a recorder to record photograph information on the film: and a controller to cause said recorder to record said photograph information on the film only during the substantially constant speed state of said motor:

wherein said film has a plurality of perforations spaced in a feed direction of the film, and wherein said controller includes a detector to detect passage of a predetermined number of film perforations during feeding of the film and thereafter to cause said recorder to record photograph information.

24. Information recording apparatus in a camera, comprising:

a film feeding unit having a motor to feed a film, the motor having a transient speed state during the starting and stopping of the feeding of the film and having a substantially constant speed state after a predetermined length of film has been fed;

a recorder to record photograph information on the film; and a controller to cause said recorder to record said photograph information on the film only during the substantially constant speed state of said motor;

wherein said controller causes said recorder to record finished photograph information, indicating that a corresponding film frame has been exposed, during said transient speed state.

25. Information recording apparatus in a camera, comprising:

a film feeding unit having a motor to feed a film:

a recorder to record finished photograph information on said film indicating that a corresponding film frame has been exposed and to record other photograph information on said film; and a controller to cause said recorder to record said finished photograph information on the film while the motor is starting or stopping and to record said other photograph information on the film only when the motor speed is substantially constant, said finished photograph information and said other photograph information being recorded at different recording frequencies.

26. Information recording apparatus in a camera, comprising:

a film feeding unit having a motor to feed a film having successive frames, the film having a recording area adjacent to a front end and/or a rear end of each film frame;

a detector to detect said recording area;

a recorder to record onto said recording area finished photograph information indicating that a corresponding film frame has been exposed; and a controller to control said recorder to enable said recorder as the film feeding is started and to disable said recorder in accordance with a result of said detector.

27. Information recording apparatus in a camera which is capable of recording information onto a film, comprising:

a film feeding unit having a motor to feed a film having a plurality of perforations spaced in a feed direction of the film;

a recorder to record photograph information onto said film;

a detector to detect an area disposed on the film, onto which said photograph information is recorded, in accordance with said perforations during feeding of the film, and a controller to cause said recorder to record said photograph information onto the film in accordance with a result of said detector.

28. Information recording apparatus in a camera, comprising:

film feeding means which can feed a film in a winding direction and in a rewinding direction;

information recording means for recording information on the film as the film is fed;

information reproducing means for reproducing information recorded on the film as the film is fed; and controlling means for controlling the film feeding means so that when the film is reloaded, recorded information is reproduced by the information reproducing means, while said film feeding means feeds the film, and when an absence of information recorded on the film is detected by the reproducing means, a feeding direction of the film is reversed to place an unexposed film portion following an exposed film portion in a position in which the unexposed film portion is opposite an aperture of the camera.

29. The apparatus as defined in claim 28, wherein said controlling means feeds the film by one exposing film portion after reversing the feeding direction of the film.

30. Information recording apparatus in a camera, comprising:

a film feeding unit which can feed a film in a winding direction and in a rewinding direction;

a recorder to record information on the film as the film is fed;

a playback system to play back the information recorded on the film as the film is fed; and a controller to control the film feeding unit so that when the film is reloaded, recorded information is played back while said film feeding unit feeds the film, and when an absence of information recorded on the film is detected by the playback system, a feeding direction of the film is reversed to place an unexposed film portion following an exposed film portion in a position in which the unexposed film portion is opposite an aperture of the camera.

* * * * *

UNITED STATES PATENT AND TRADEMARK OFFICE
CERTIFICATE OF CORRECTION

PATENT NO. : 5,493,355
DATED : February 20, 1996
INVENTOR(S) : Kazuyuki KAZAMI

It is certified that error appears in the above-indentified patent and that said Letters Patent is hereby corrected as shown below:

IN THE CLAIMS:

Column 12, line 11, claim 20, after "information", insert --onto the film during said constant speed state and causes said recording means to record during said transient speed state finished photograph information indicating that a corresponding film frame has been exposed.--

Signed and Sealed this

Fourteenth Day of May, 1996

Attest:

BRUCE LEHMAN

*Attesting Officer*            *Commissioner of Patents and Trademarks*